(12) United States Patent
Tsai et al.

(10) Patent No.: US 8,729,854 B2
(45) Date of Patent: May 20, 2014

(54) SLOT-TYPE INDUCTION CHARGER

(75) Inventors: Ming-Chiu Tsai, New Taipei (TW);
Chi-Che Chan, New Taipei (TW)

(73) Assignee: Fu Da Tong Technology Co., Ltd.,
Zhonghe Dist., New Taipei (TW)

( * ) Notice: Subject to any disclaimer, the term of this patent is extended or adjusted under 35 U.S.C. 154(b) by 328 days.

(21) Appl. No.: 13/355,922

(22) Filed: Jan. 23, 2012

(65) Prior Publication Data

US 2013/0093386 A1    Apr. 18, 2013

Related U.S. Application Data

(63) Continuation-in-part of application No. 13/276,014, filed on Oct. 18, 2011.

(51) Int. Cl.
*H02J 7/00* (2006.01)
(52) U.S. Cl.
USPC .......................................... 320/108; 320/115
(58) Field of Classification Search
CPC ............................... H02J 7/0044; H02J 7/025
USPC .................................................. 320/108, 115
See application file for complete search history.

(56) References Cited

U.S. PATENT DOCUMENTS

| | | | | |
|---|---|---|---|---|
| 7,271,569 B2* | 9/2007 | Oglesbee | | 320/108 |
| 7,323,964 B1* | 1/2008 | Shyu et al. | | 336/131 |
| 7,629,768 B2* | 12/2009 | Pinedjian | | 320/115 |
| 7,868,585 B2* | 1/2011 | Sarnowsky et al. | | 320/108 |
| 8,344,688 B2* | 1/2013 | Yoda et al. | | 320/107 |
| 8,436,576 B2* | 5/2013 | Toya et al. | | 320/108 |
| 2011/0227529 A1* | 9/2011 | Smith et al. | | 320/108 |
| 2012/0206090 A1* | 8/2012 | Hyun-Jun et al. | | 320/107 |
| 2013/0093252 A1* | 4/2013 | Norconk et al. | | 307/104 |

* cited by examiner

*Primary Examiner* — Edward Tso
*Assistant Examiner* — Ramy Ramadan
(74) *Attorney, Agent, or Firm* — Winston Hsu; Scott Margo (57) ABSTRACT

A slot-type induction charger having light, thin, short and small characteristics is disclosed to include a power base holding therein a control module and a power-supplying coil module in a base member thereof for inducing an electric current, and an induction charging receiver set in the base member for receiving the induced electric current by electromagnetic induction from the power base for charging an electromagnetic device being connected to an electrical connector thereof. The power-supplying coil module and the power-receiving coil module each includes a magnetic conductor and a series of coils being alternatively and reversely wound around the magnetic conductor.

3 Claims, 9 Drawing Sheets

SLOT-TYPE INDUCTION CHARGER

This application is a Continuation-In-Part of application Ser. No. 13/276,014, filed on Oct. 18, 2011, now pending. The patent application identified above is incorporated here by reference in its entirety to provide continuity of disclosure.

BACKGROUND OF THE INVENTION

1. Field of the Invention

The present invention relates to battery charging technology and more particularly, to a slot-type induction charger, which uses an induction charging receiver in a narrow slot of a thin thickness power base to receive an induced electric current from a power-supplying coil module of the power base by means of electromagnetic induction for charging an electromagnetic device being attached thereto.

2. Description of the Related Art

Following fast development of electronic and multimedia information technologies, notebook computer, tablet computer, smart mobile phone, PDA and many other handheld electronic devices have been continuously developed and have appeared on the market. These mobile electronic products commonly have light, thin, short and small characteristics, and are convenient for carrying. Further, related application software has also been continuously created, enhancing hardware performance.

However, when using an electronic device for mobile application, the first problem to be solved is the supplying of power supply. A mobile handheld electronic device generally uses a rechargeable battery to provide the necessary working voltage. When power is low, the rechargeable battery can be recharged. For charging the rechargeable battery of a digital electronic product, a battery charger shall be used. However, it is not economic to purchase a respective mating battery charger when buying a new mobile electronic device. Further, it is inconvenient to carry and store many different mobile electronic devices and the related mating battery chargers.

In view of the aforesaid problems, some manufacturers created electromagnetic induction type power supply device or the so-called wireless battery charger for charging handheld electronic devices. This non-contact electromagnetic induction power supply devices bring great convenience to users. Briefly speaking, an electromagnetic induction power supplying method uses two induction coils to transmit electric energy. The theory of operation of the electromagnetic induction power supplying method is same as conventional coil transformers. A wireless battery charger can charge different electronic devices that have built therein a mating induction coil. Thus, a wireless battery charger can charge different electronic devices, eliminating the drawbacks of conventional power supply devices that cannot give mutual support, are not interchangeable and inconvenient for carrying.

Figure 9:
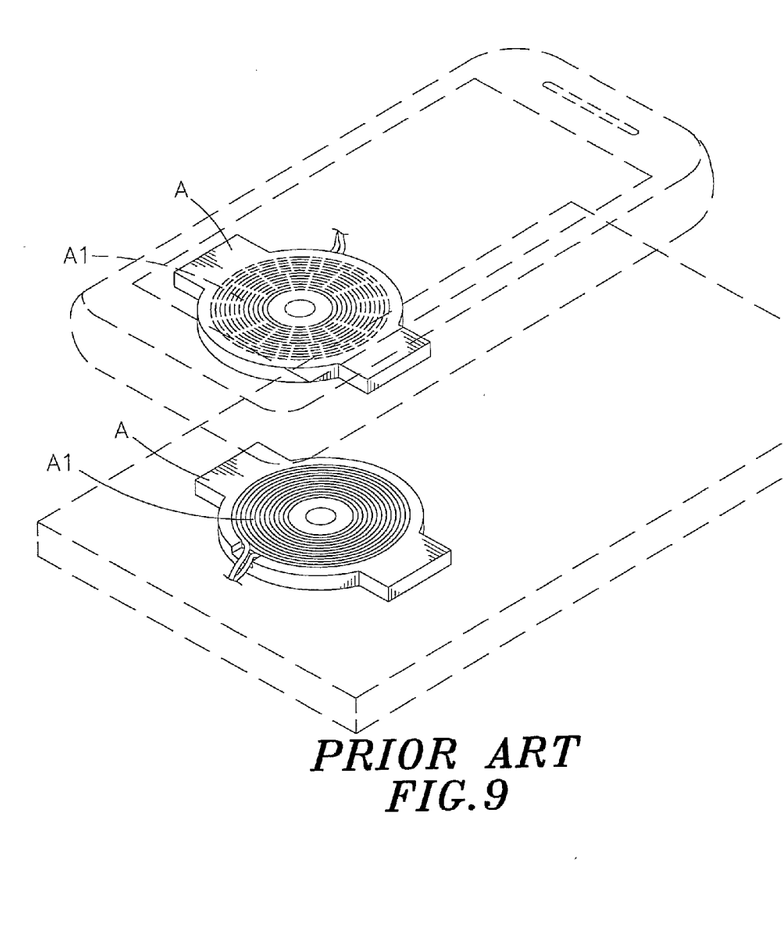
FIG. 9 is a schematic drawing illustrating an induction charger according to the prior art.

Commercial induction type power supply devices or wireless battery chargers commonly use two coil modules. One coil module works as a power-supplying end for emitting electric current. The other coil module works as a power-receiving end for receiving the induced electric current from the power-supplying end. The power-supplying coil module and the power-receiving coil module commonly comprise a magnetic conductor and a coil wound round the magnetic conductor. The power-supplying coil module emits electric energy through an induction surface thereof. A coil module has a certain amount of inductance, and works with a capacitor to create resonance, thereby inducing an electric current. FIG. 9 illustrates induction charger according to the prior art.

As illustrated, the induction charger includes two planar spiral coils A1 respectively arranged in a respective planar substrate A inside a respective electronic device. As the induced electric current is transmitted through top and bottom sides of the planar spiral coil A1 of the power-supplying end, the induced electric current cannot be completely received by the planar spiral coil A1 of the power-receiving end. During transmission of the induced electric current, the transmitted electric energy may be partially received by surrounding components, causing heat damage. Therefore, the planar substrates A must be made of a magnetic material to insulate electromagnetic waves.

Magnetic materials may have the characteristic of being reflective, absorptive or conductive relative to electromagnetic waves. The normal way to obtain a better power transmission efficiency is to attach a magnetic material of high reflectivity relative to electromagnetic waves to the non-induction surface of the planar spiral coil A1 of the power-supplying end and a magnetic material of high absorbability relative to electromagnetic waves to the non-conduction surface of the planar spiral coil A1 of the power-receiving end. This measure can obtain better conversion efficiency. However, it is expensive and not easy to make a magnetic material having a reflective or absorptive characteristic relative to electromagnetic waves. Further, the big induction surface area of the planar spiral coil A1 at the planar substrate A can obtain better induction power. However, because the planar spiral coil A1 is close to a circular shape, not convenient for installation in a compact handheld electronic device. In consequence, the application of conventional induction type power supply devices or wireless battery chargers is limited.

SUMMARY OF THE INVENTION

The present invention has been accomplished under the circumstances in view. It is one object of the present invention to provide a slot-type induction charger, which requires less installation space, and is practical for use to charge different mobile electronic devices.

To achieve this and other objects of the present invention, a slot-type induction charger comprises a power base and an induction charging receiver. The power base comprises a base member defining therein a slot, a control module mounted in the slot of the base member and a power-supplying coil module mounted in the slot and electrically coupled to the control module for creating oscillation to emit an electric energy. The induction charging receiver is set in the slot of the base member of the power base for receiving the electric energy from the power-supplying coil module by electromagnetic induction for charging an electromagnetic device. The induction charging receiver comprises an expansion base, a charging module mounted in the expansion base and a power-receiving coil module mounted in the expansion base and electrically coupled to the charging module and adapted for receiving the electric energy from the power-supplying coil module by means of electromagnetic induction. The expansion base comprises an electric connector for the connection of an electromechanical device to be charged. The power-supplying coil module and the power-receiving coil module each comprise a magnetic conductor, a plurality of first coils and at least one second coil alternatively wound round the magnetic conductor in reversed directions and electrically connected in series, and an induction zone defined between each second coil and each adjacent first coil. Thus, the use of the induction charging receiver does not increase the thickness of the attached electromechanical device, and the slot-type induction charger does not require much installation space and can be installed in a narrow space area in a car, i.e., the slot-type induction charger has light, thin, short and small characteristics.

In an alternate form of the present invention, the slot-type induction charger comprises one power base and two induction charging receivers set in the slot of the base member of the power base. Thus, the slot-type induction charger can charge two electronic devices at a time. Further, the base member of the power base can be installed in an interior decorative panel (dashboard, handrail fitting or door panel) or the center console of a car. Alternatively, the slot-type induction charger of the present invention can be embedded in a computer peripheral device (keyboard, mouse, wireless tablet), stereo head unit, game machine head unit, electric home appliance, or any of a variety of other peripheral devices. Further, with the position limitation effect of the slot of the base member of the power base, the induction charging receiver(s) with the attached electromechanical device(s) are kept in high stability and will not fall out of the power base accidentally when the car carrying the slot-type induction charger is vibrating, protecting the electromechanical device(s) from scratches and other damage.

Further, the base member of the power base can be installed in a wall with the control module electrically connected to a city power supply outlet or power adapter by a power cable, and the induction charging receiver can be installed in the rear bumper of a car with the electric connector of the expansion base electrically connected to the power circuit of the car power source (storage battery, power battery or car battery) of the car. When the car is moved to a position where the rear bumper is kept in proximity to the power base in the wall, an electromagnetic induction is initiated to perform transmission of signal and electric energy from the power base to the attached electromechanical device(s) through the induction charging receiver(s).

DETAILED DESCRIPTION OF THE PREFERRED EMBODIMENT

Referring to FIGS. 1~4, a slot-type induction charger in accordance with the present invention is shown comprising a power base 1 and an induction charging receiver 2.

The power base 1 comprises a base member 11, a control module 10 mounted in the base member 11, and a power-supplying coil module 12 mounted in the base member 11 and electrically coupled to the control module 10. The base member 11 defines therein a slot 111 for accommodating the induction charging receiver 2 and an electromechanical device 3. The power-supplying coil module 12 comprises a power-supplying magnetic conductor 121 and power-supplying induction coils 122. The power-supplying magnetic conductor 121 is an elongated flat bar. The power-supplying induction coils 122 are formed of one single insulated conducting wire 1220 that is wound round one end of the power-supplying magnetic conductor 121 through a predetermined number of turns in a first direction (clockwise direction) to form a first power-supplying coil 1221, and then extended along the length of the power-supplying magnetic conductor 121 toward the other end of the power-supplying magnetic conductor 121 to a predetermined length and wound around another part of the power-supplying magnetic conductor 121 through a predetermined number of turns in a second direction (counter-clockwise direction) reversed to the first direction to form a second power-supplying coil 1222 and a power-supplying induction zone 120 between the first power-supplying coil 1221 and the second power-supplying coil 1222, and then extended along the length of the power-supplying magnetic conductor 121 toward the other end of the power-supplying magnetic conductor 121 to a predetermined length and wound around another part of the power-supplying magnetic conductor 121 through a predetermined number of turns in the first direction (clockwise direction) to form another first coil 1221 and another power-supplying induction zone 120 between the second power-supplying coil 1221 and this newly formed first power-supplying coil 1221, and so on.

The induction charging receiver 2 comprises an expansion base 21, a charging module 20 mounted in the expansion base 21, and a power-receiving coil module 22 mounted in the expansion base 21 and electrically coupled to the charging module 20 and adapted for receiving electric energy by electromagnetic induction. The expansion base 21 comprises an electric connector 211 for the connection of an electromechanical device 3. The power-receiving coil module 22 comprises a power-receiving magnetic conductor 221 and power-receiving induction coils 222. The power-receiving magnetic conductor 221 is an elongated flat bar. The power-receiving induction coils 222 are formed of one single insulated conducting wire 2220 that is wound round one end of the power-receiving magnetic conductor 221 through a predetermined number of turns in a first direction (clockwise direction) to form a first power-receiving coil 2221, and then extended along the length of the power-receiving magnetic conductor 221 toward the other end of the power-receiving magnetic conductor 221 to a predetermined length and wound around another part of the power-receiving magnetic conductor 221 through a predetermined number of turns in a second direction (counter-clockwise direction) reversed to the first direction to form a second power-receiving coil 2222 and a power-receiving induction zone 220 between the first power-receiving coil 2221 and the second power-receiving coil 2222, and then extended along the length of the power-receiving magnetic conductor 221 toward the other end of the power-receiving magnetic conductor 221 to a predetermined length and wound around another part of the power-receiving magnetic conductor 221 through a predetermined number of turns in the first direction (clockwise direction) to form another first power-receiving coil 2221 and another power-receiving induction zone 220 between the second power-receiving coil 2221 and this newly formed first power-receiving coil 2221, and so on.

Figure 1:
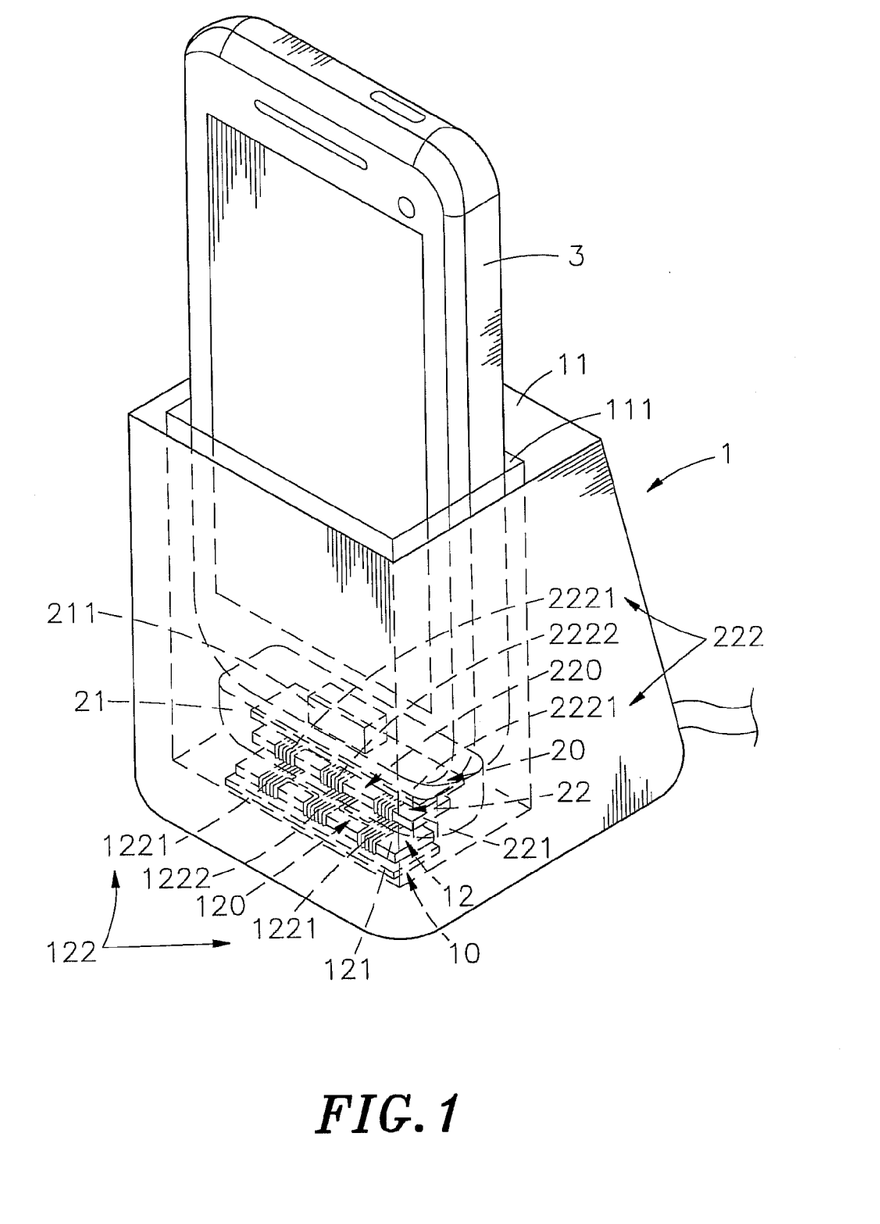
FIG. 1 is a perspective view of a slot-type induction charger in accordance with the present invention.
Figure 2:
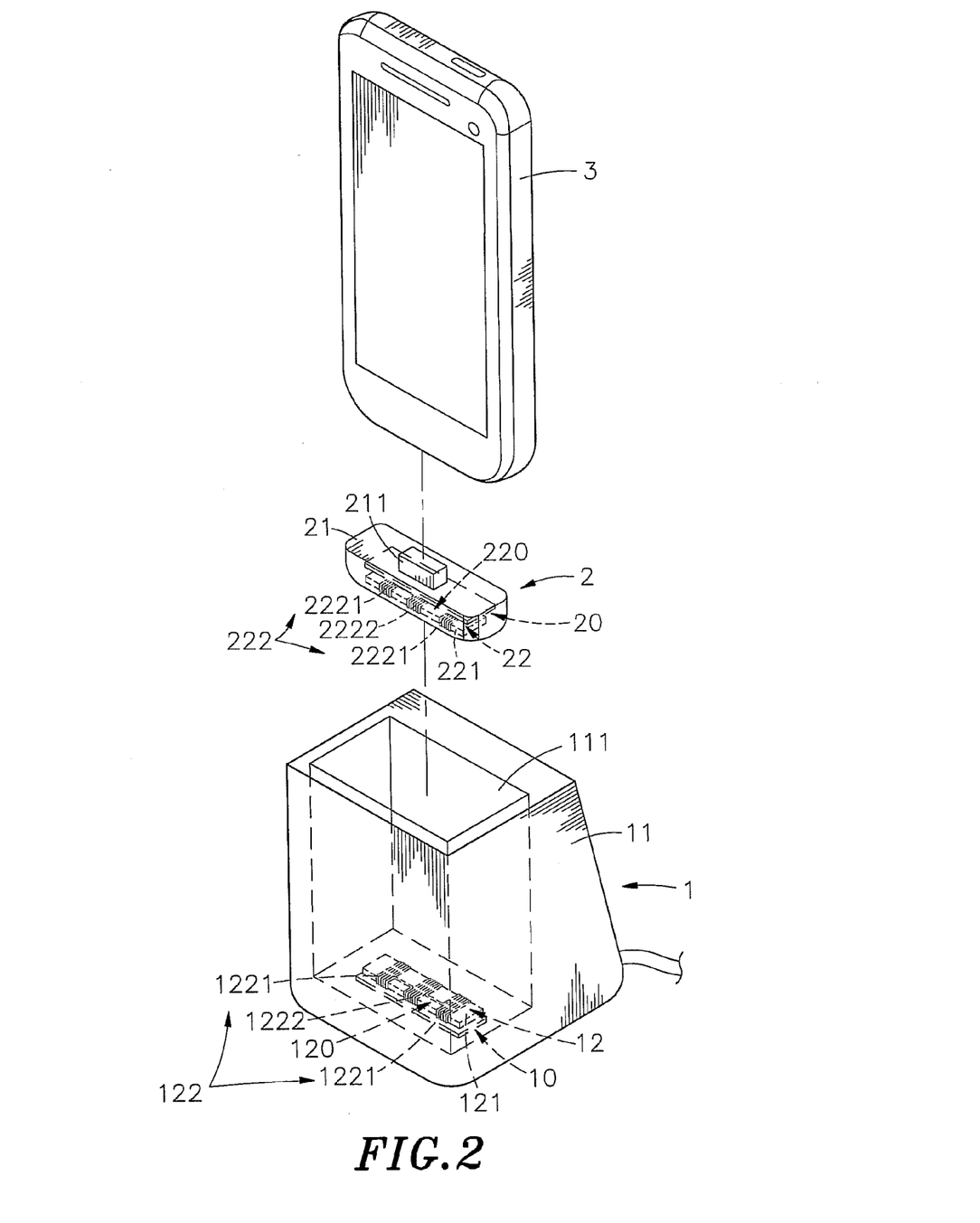
FIG. 2 is an exploded view of the slot-type induction charger in accordance with the present invention.
Figure 3:
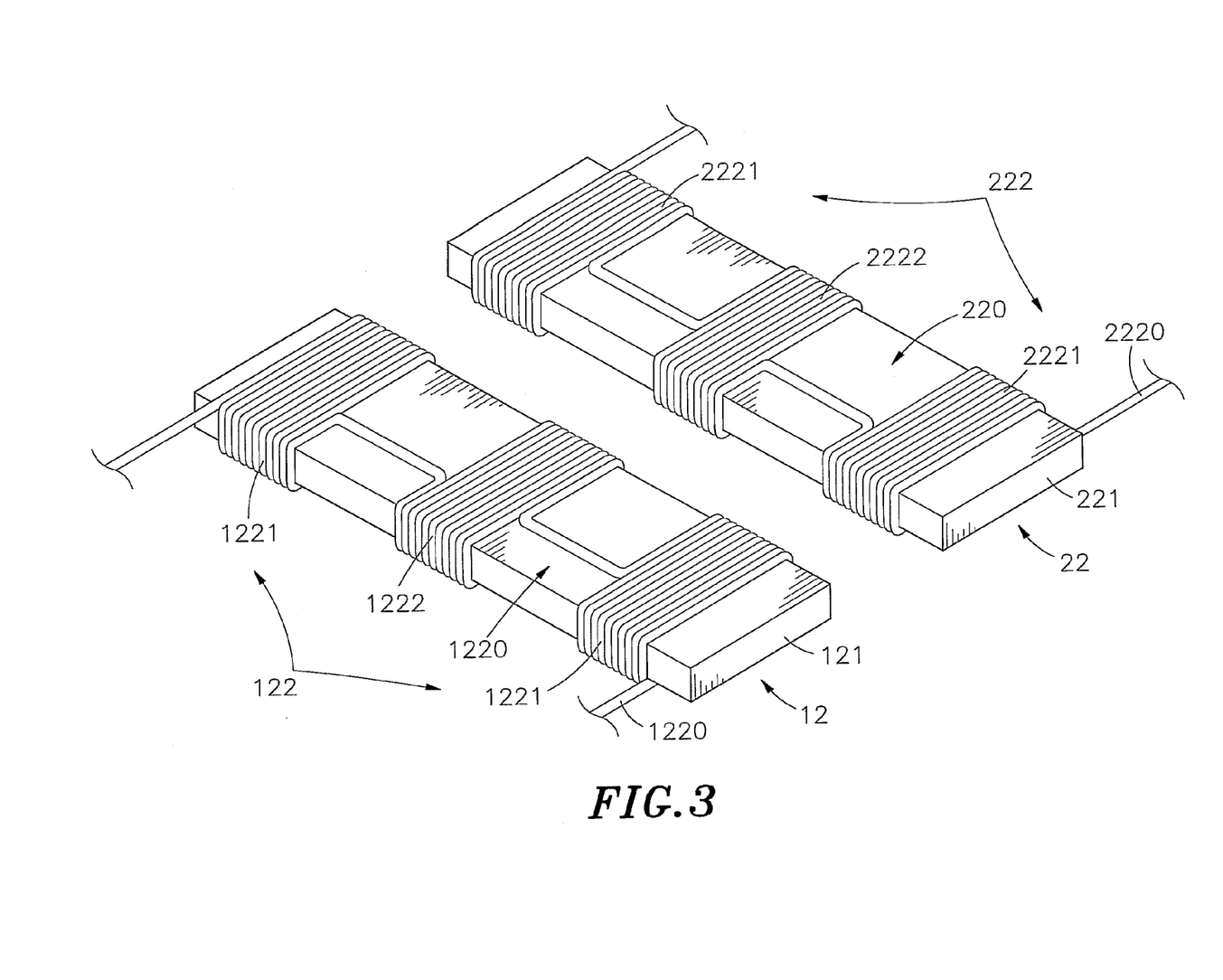
FIG. 3 is an exploded view, in an enlarged scale, of a part of the slot-type induction charger in accordance with the present invention, illustrating the structural design of the power-supplying coil module of the power base and the power-receiving coil module of the induction charging receiver.

Further, the power-supplying magnetic conductor 121 of the power-supplying coil module 12 of the power base 1 and the power-receiving magnetic conductor 221 of the power-receiving coil module 22 of the induction charging receiver 2 are made of a magnetic material having high magnetoconductivity that can be selected from the group of iron powder, MPP (molybdenum permalloy powder) cores, sendust, ferrite and high flux cores that are intensively used in commercial induction components for the advantage of low manufacturing cost. These power-supplying/power-receiving magnetic conductors 121; 221 can be made having a square, rectangular or polygonal cross section configured subject to the size of the power base 1 or induction charging receiver 2. Thus, the power-supplying/power-receiving induction coils 122 or 222 are wound round the power-supplying/power-receiving magnetic conductor 121 or 221 subject to electromagnetic theory. Further, the diameter of the insulated conducting wires 1220 and 2220, the number of coils of the power-supplying coil module 12 and the power-receiving coil module 22 and the number of turns of each of the power-supplying/power-receiving induction coils 122 and 222 are determined subject to the inductance of the induction power system.

Figure 4:
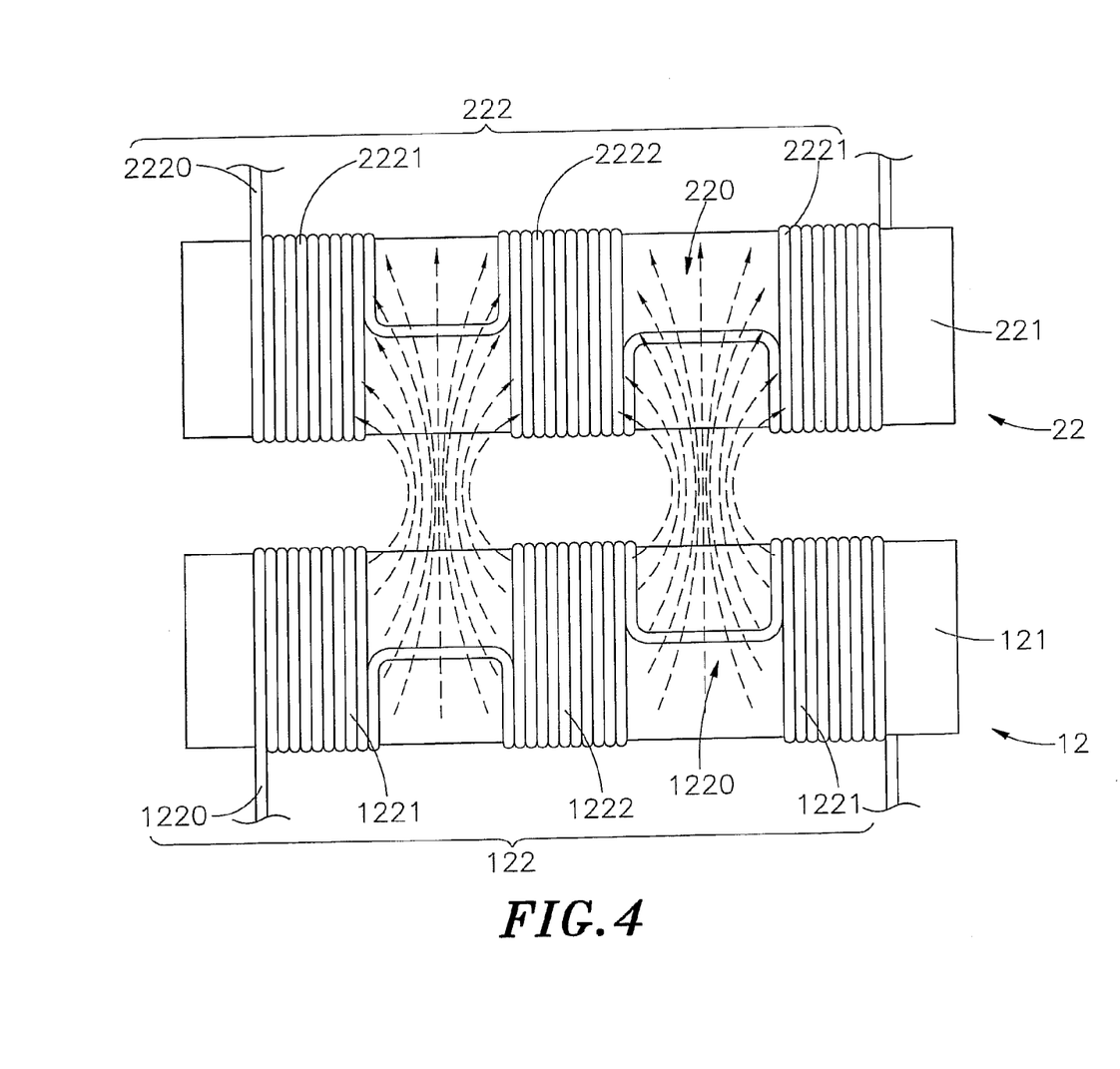
FIG. 4 is a schematic drawing of the present invention, illustration electromagnetic induction between the power-supplying coil module of the power base and the power-receiving coil module of the induction charging receiver.

During application of the present invention, matching resonance induced by the control module 10 of the power base 1 and the power-supplying magnetic conductor 121 and power-supplying induction coils 122 of the power-supplying coil module 12 of the power base 1 causes oscillation to emit electromagnetic radiating energy to the induction charging receiver 2. At this time, the power-receiving induction zone 220 between each first power-receiving coil 2221 and each adjacent second power-receiving coil 2222 of the power-receiving induction coils 222 at the power-receiving magnetic conductor 221 is induced to receive the electromagnetic radiating energy, thereby generating an electric current. The charging module 20 of the induction charging receiver 2 is adapted to transmit signal from the power base 1 to the electromechanical device 3 and to conduct electric current from the power-supplying coil module 12 of the power base 1 through the electric connector 211 of the expansion base 21 to the electromechanical device 3.

Subject to the design of the power-supplying coil module 12 of the power base 1 and the design of the power-receiving coil module 22 of the induction charging receiver 2 to wound a second power-supplying/power-receiving coil 1222 or 2222 round the power-supplying/power-receiving magnetic conductor 121 or 221 between each two adjacent first power-supplying/power-receiving coils 1221 or 2221 and to form a power-supplying/power-receiving induction zone 120 or 220 between each first power-supplying/power-receiving coil 1221 or 2221 and each adjacent second power-supplying/power-receiving coil 1222 or 2222, a high stability of wireless transmission of power supply is assured. Further, the high magnetoconductivity characteristic of the power-supplying/power-receiving magnetic conductors 121 and 221 effectively controls electromagnetic wave scattering, avoiding electromagnetic interference with nearby electronic components or devices. Thus, it is unnecessary to provide any electromagnetic absorber or shield means at the non-induction side of the power-supplying coil module 12 of the power base 1 or the power-receiving coil module 22 of the induction charging receiver 2.

Figure 5:
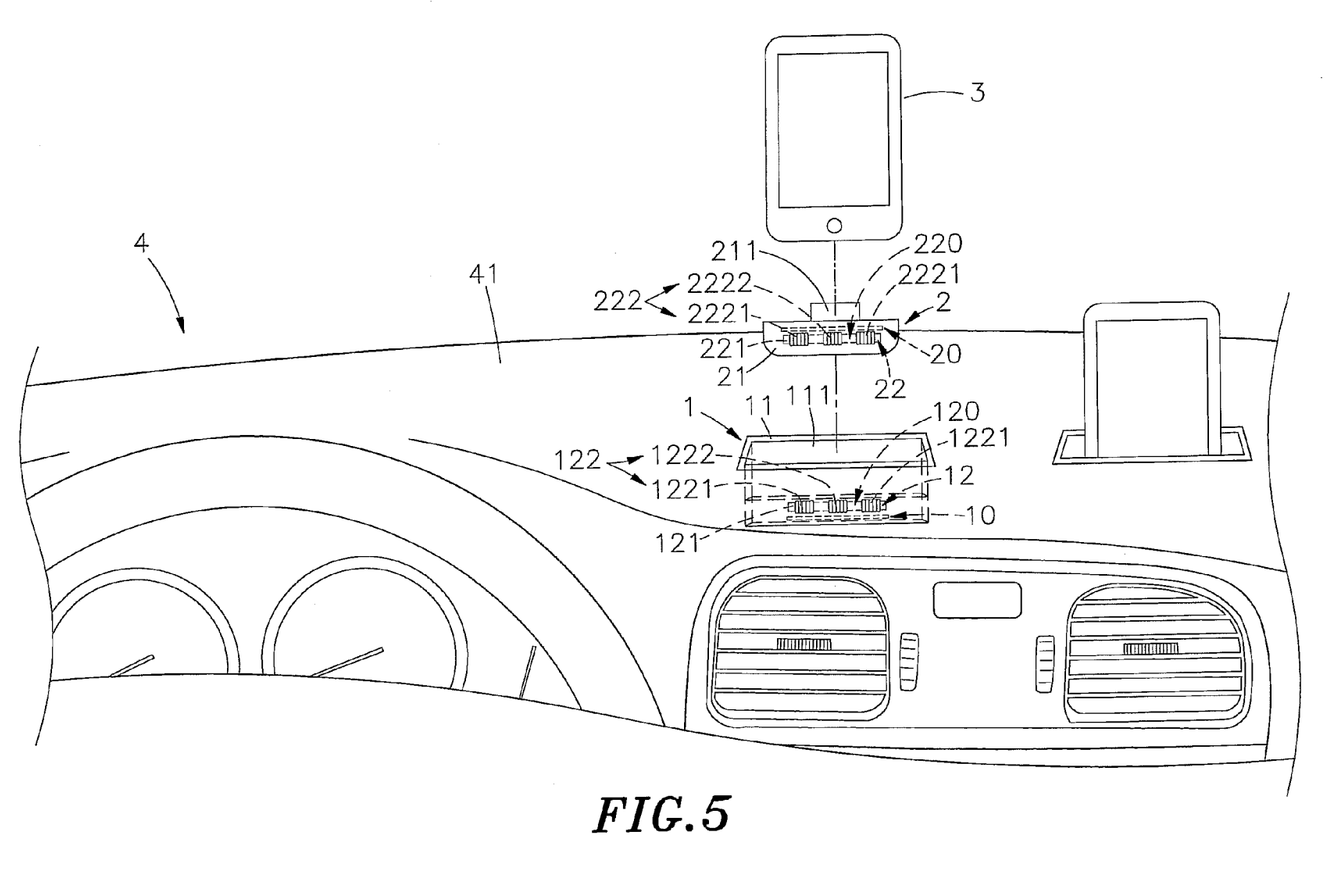
FIG. 5 is a schematic drawing illustrating an application example of the slot-type induction charger in accordance with the present invention.
Figure 6:
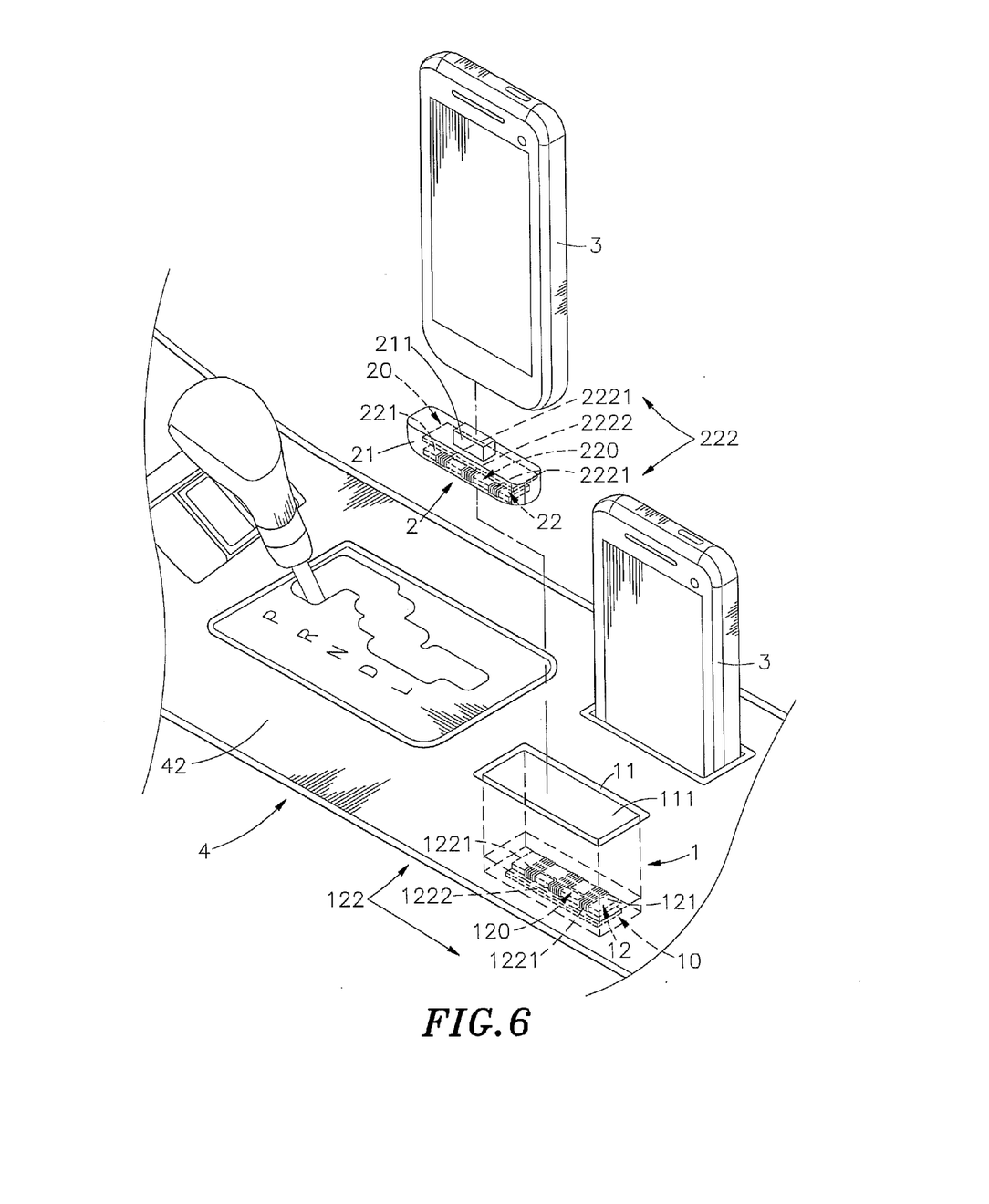
FIG. 6 is a schematic drawing illustrating another application example of the slot-type induction charger in accordance with the present invention.
Figure 7:
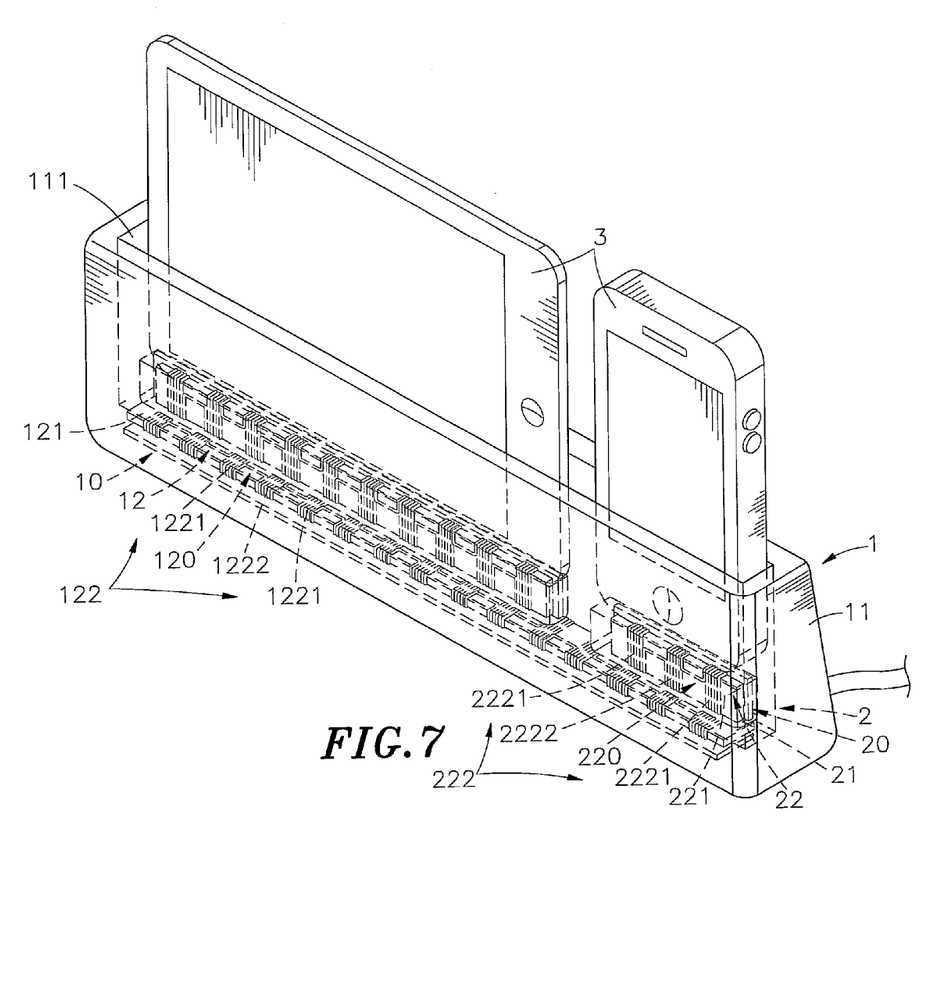
FIG. 7 is a schematic drawing illustrating a status of use of an alternate form of the slot-type induction charger in accordance with the present invention.

FIGS. 5 through 7 illustrate various different application examples of the present invention. The slot-type induction charger of the present invention can be installed in an interior decorative panel (dashboard, handrail fitting or door panel) 41 of a car 4 (see FIG. 5), or the center console 42 of a car 4 (see FIG. 6). Alternatively, the slot-type induction charger of the present invention can be embedded in a computer peripheral device (keyboard, mouse, wireless tablet), stereo head unit, game machine head unit, electric home appliance, or any of a variety of other peripheral devices.

In the case that the slot-type induction charger is installed in the dashboard 41 or center console 42 of a car 4, the control module 10 is electrically connected to the power circuit of the battery power supply or power adapter of the car 4 by a power cable (not shown) for power input. When a user connects a mating electric connector of an electromechanical device 3 (such as tablet computer, smart mobile phone, GPS navigator, Bluetooth earphone, etc.) to the electric connector 211 of the expansion base 21, the electromechanical device 3 is electrically coupled to the charging module 20 of the induction charging receiver 2. Further, electric connector 211 of the expansion base 21 can be configured subject to any of various different specifications to fit different mobile electromechanical devices.

During use, attach the electromechanical device 3 to the electric connector 211 of the expansion base 21 of the induction charging receiver 2 and then set the induction charging receiver 2 with the attached electromechanical device 3 in the slot 111 of the base member 11 of the power base 1. In an alternate form of the present invention as shown in FIG. 7, two induction charging receivers 2 are set in the slot 111 of the base member 11 of the power base 1 for charging two electromechanical devices 3. After setting of the induction charging receiver(s) 2 with the attached electromechanical device(s) 3 in the slot 111 of the base member 11 of the power base 1, transmission of signal and electric energy from the power base 1 to the attached electromechanical device(s) 3 through the induction charging receiver(s) 2 can then be started, achieving induction charging. Further, with the position limitation effect of the slot 111 of the base member 11 of the power base 1, the induction charging receiver(s) 2 with the attached electromechanical device(s) 3 are kept in high stability and will not fall out of the power base 1 accidentally when the car carrying the slot-type induction charger is vibrating, protecting the electromechanical device(s) 3 from scratches and other damage.

As the power-supplying coil module 12 of the power base 1 and the power-receiving coil module 22 of the induction charging receiver 2 are respectively disposed inside the base member 11 or at the bottom side or lateral side of the expansion base 21 and the power-supplying/power-receiving induction zones 120 and 220 between the respective first power-supplying/power-receiving coils 1221 and 2221 and the respective adjacent second power-supplying/power-receiving coils 1222 and 2222 work to induce electric energy, the use of the induction charging receiver 2 does not increase the thickness of the attached electromechanical device 3 (the induction charging receiver 2 can be made not thicker than the electromechanical device 3 to be charged). Therefore, the slot-type induction charger does not require much installation space and can be installed in a narrow space area in a car, i.e., the slot-type induction charger has light, thin, short and small characteristics. Further, as the power-supplying coil module 12 of the power base 1 and the power-receiving coil module 22 of the induction charging receiver 2 are kept close to each other, the induction charging receiver 2 can achieve a high performance in electromagnetic induction, assuring high stability of induced electric current and high power transmission efficiency.

Figure 8:
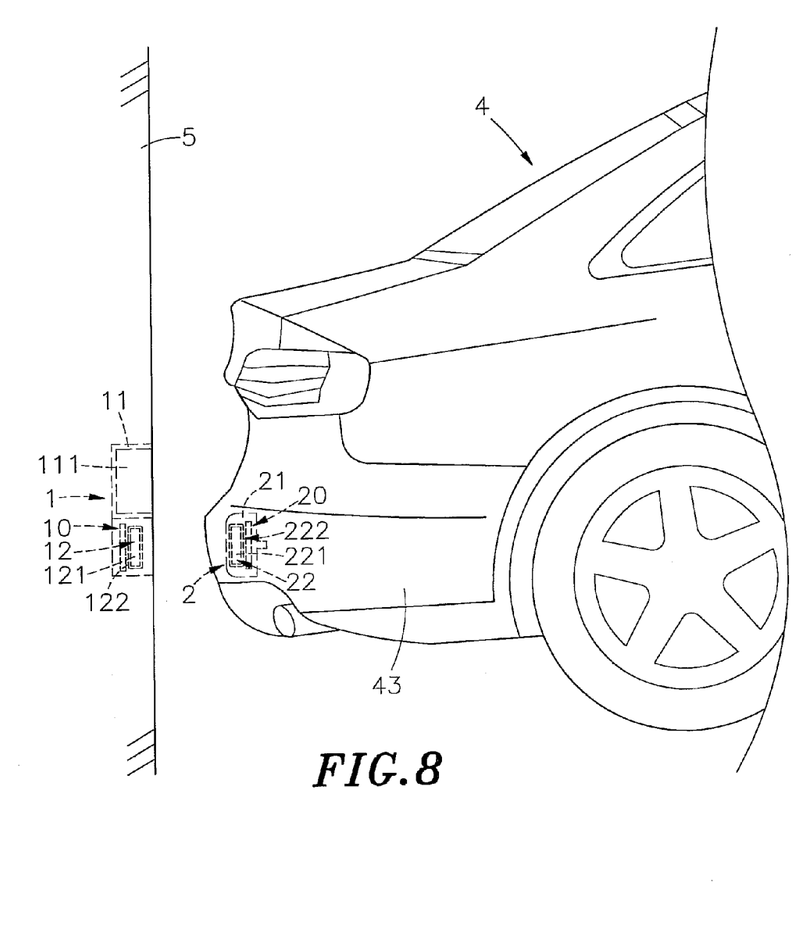
FIG. 8 is a schematic drawing illustrating still another application example of the slot-type induction charger in accordance with the present invention.

In the application example shown in FIG. 8, the power base 1 is installed in a wall 5 with the control module 10 electrically connected to a city power supply outlet or power adapter by a power cable (not shown); the induction charging receiver 2 is installed in the rear bumper 43 of a car 4 with the electric connector 211 of the expansion base 21 electrically connected to the power circuit of the car power source (storage battery, power battery or car battery) of the car 4. When the car 4 is moved to a position where the rear bumper 43 is kept in proximity to the power base 1 in the wall 5, an electromagnetic induction is initiated to perform transmission of signal and electric energy from the power base 1 to the attached electromechanical device(s) 3 through the induction charging receiver(s) 2. Further, one or two induction charging receivers 2 can be set in the slot 111 of the base member 11 of the power base 1 in the wall 5 for charging one or two electromechanical device(s) 3.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A slot-type induction charger, comprising:
power base comprising a base member defining therein a slot, a control module mounted in said slot of said base member and a power-supplying coil module mounted in said slot of said base member and electrically coupled to said control module for creating oscillation to emit an electric energy, said power-supplying coil module comprising a power-supplying magnetic conductor, a plurality of first power-supplying coils and at least one second power-supplying coil respectively wound round said power-supplying magnetic conductor in reversed directions, each said second power-supplying coil being electrically connected in series between two said first power-supplying coils, and a power-supplying induction zone defined between each said second power-supplying coil and each adjacent said first power-supplying coil; and
least one induction charging receiver settable in said slot of said base member of said power base for receiving said electric energy from said power-supplying coil module by electromagnetic induction for charging an electromagnetic device, each said induction charging receiver comprising an expansion base, a charging module mounted in said expansion base and a power-receiving coil module mounted in said expansion base and electrically coupled to said charging module and adapted for receiving an electric energy induced by said power-supplying coil module by means of electromagnetic induction, said expansion base comprising an electric connector for the connection of an electromechanical device to be charged, said power-receiving coil module comprising a power-receiving magnetic conductor, a plurality of first power-receiving coils and at least one second power-receiving coil wound round said power- magnetic conductor in reversed directions, each said second power-receiving coil being electrically connected in series between two said first power-receiving coils, and a power-receiving induction zone defined between each said second power-receiving coil and each adjacent said first power-receiving coil.

2. The slot-type induction charger as claimed in claim 1, wherein said power-supplying magnetic conductor and said power-receiving magnetic conductor are elongated flat bars, each having a cross section in one of square, rectangular and polygonal shapes.

3. The slot-type induction charger as claimed in claim 1, wherein said power-supplying magnetic conductor and said power-receiving magnetic conductor are selected from the group of iron powder, MPP (molybdenum permalloy powder) cores, sendust, ferrite and high flux cores.

\* \* \* \* \*